United States Patent
Otsuki et al.

(10) Patent No.: US 10,493,435 B2
(45) Date of Patent: Dec. 3, 2019

(54) MICRO COIL

(71) Applicant: Toyota Jidosha Kabushiki Kaisha, Toyota-shi, Aichi-ken (JP)

(72) Inventors: Hiroshi Otsuki, Gotemba (JP); Shinji Ikeda, Mishima (JP); Norio Inami, Susono (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 85 days.

(21) Appl. No.: 15/978,469

(22) Filed: May 14, 2018

(65) Prior Publication Data

US 2018/0333700 A1 Nov. 22, 2018

(30) Foreign Application Priority Data

May 16, 2017 (JP) ................. 2017-096938

(51) Int. Cl.

| | |
|---|---|
| *B01J 23/50* | (2006.01) |
| *B01D 53/94* | (2006.01) |
| *B01J 21/06* | (2006.01) |
| *B01J 21/18* | (2006.01) |
| *B01J 23/00* | (2006.01) |
| *B01J 27/22* | (2006.01) |
| *B01J 27/24* | (2006.01) |
| *B01J 35/00* | (2006.01) |
| *B01J 35/02* | (2006.01) |
| *F01N 3/20* | (2006.01) |

(52) U.S. Cl.
CPC .......... *B01J 23/50* (2013.01); *B01D 53/9431* (2013.01); *B01J 21/063* (2013.01); *B01J 21/18* (2013.01); *B01J 23/002* (2013.01); *B01J 27/22* (2013.01); *B01J 27/24* (2013.01); *B01J 35/0033* (2013.01); *B01J 35/02* (2013.01); *F01N 3/2013* (2013.01); *B01D 2255/90* (2013.01)

(58) Field of Classification Search
CPC . B01J 23/50; B01J 21/063; B01J 21/18; B01J 23/002; B01J 27/22; B01J 27/24; B01J 35/0033; B01J 35/02; B01D 53/9431; B01D 2255/90; F01N 3/2013

USPC ............................................. 502/2
See application file for complete search history.

(56) References Cited

U.S. PATENT DOCUMENTS

2015/0068479 A1  3/2015  Ikeda

FOREIGN PATENT DOCUMENTS

| JP | 2001-146644 A | 5/2001 |
| JP | 2011148682 A | 8/2011 |
| JP | 2012012736 A | 1/2012 |
| JP | 2015-172152 A | 10/2015 |

OTHER PUBLICATIONS

Batrakov, A. D., To help the budding radio amateur, Radiofront, 1938, n. 17-18, p. 75—col. 1, lines 10-16, 24-29—Including Partial Translation of Office Action issued to counterpart foreign application RU2018117883.

Motojima, S. et al., "Preparation of TiO2 microcoils from carbon microcoil templates using a sol-gel process", Chemical Physics Letters 378, 2003, p. 111-116.

Motojima, Seiji, "Development of ceramic microcoils with 3D-helical/spiral structures", Journal of the Ceramic Society of Japan 116 (9), 2008, p. 921-927.

Teraoka, Yasutake et al., "Reaction mechanism of direct decomposition of nitric oxide over Co- and Mn-based perovskite-type oxides", Journal of the Chemical Society, Faraday Transaction, 1998, p. 1887-1891, vol. 94 (13).

Haneda, Masaaki et al., "Recent progess in catalytic NO decomposition", Comptes Rendus Chimie 19, 2016, p. 1254-1265.

Ajayan, P. M. et al., "Carbon nanotubes as removable templates for metal oxide nanocomposites and nanostructures", Nature, Jun. 15, 1995, p. 564-567, vol. 375.

Drew, Christopher et al., "Metal oxide-coated polymer nanofibers", Nano Letters, 2003, p. 143-147, vol. 3, No. 2.

*Primary Examiner* — Edward M Johnson

(74) *Attorney, Agent, or Firm* — Dinsmore & Shohl LLP

(57) ABSTRACT

A micro coil includes a micro coil body having heat resistance sufficient to keep the micro coil body from thermal decomposition and melting in a high-temperature environment, and a coating layer that is provided on a surface of the micro coil body, and has heat resistance and electrical conductivity under the high-temperature environment and an oxidizing atmosphere. The coating layer has a shape that causes induced current to be produced according to a magnetic-field component of radio waves, when the micro coil receives the radio waves.

8 Claims, 3 Drawing Sheets

MICRO COIL

CROSS-REFERENCE TO RELATED APPLICATIONS

This application claims priority to Japanese Patent Application No. 2017-096938 filed on May 16, 2017, which is incorporated herein by reference in its entirety including the specification, drawings and abstract.

BACKGROUND

1. Technical Field

The disclosure relates to a micro coil that absorbs radio waves and generate heat.

2. Description of Related Art

It has been considered to use a radio wave absorber in a heat generating unit for heating an exhaust clean-up catalyst that cleans up exhaust gas of an internal combustion engine, and cause the radio wave absorber to generate heat by irradiating the radio wave absorber with microwaves, so that the generated heat is utilized for heating the exhaust clean-up catalyst. The radio wave absorber generates heat by converting energy of radio waves (microwaves) with which the absorber is irradiated, into thermal energy.

In the meantime, conductive micro coils having electrical conductivity are known. As one type of the conductive micro coils, a carbon micro coil composed of coil-shaped carbon fiber is known (see, for example, Japanese Patent Application Publication No. 2012-012736 (JP 2012-012736 A)). Further, a TiC micro coil composed of coil-shaped titanium carbide (TiC) is also known as one type of the conductive micro coils.

SUMMARY

However, the carbon micro coil is oxidized and gasified if it is used under a high-temperature environment (for example, at a temperature equal to or higher than 500° C.) and an oxidizing atmosphere. In this connection, the temperature within the exhaust clean-up catalyst of the internal combustion engine is high because of high-temperature exhaust gas flowing into the catalyst, and an oxidizing atmosphere is present in the exhaust clean-up catalyst. Accordingly, the carbon micro coil cannot be located as it is in the exhaust clean-up catalyst, for example, and cannot be used as a radio wave absorber for heating the catalyst. On the other hand, if the TiC micro coil is used under a high-temperature environment and an oxidizing atmosphere, the coil is oxidized and changed into a $TiO_2$ micro coil, resulting in a loss of the conductivity and reduction of the radio wave absorbing capability. Thus, the TiC micro coil cannot also be located in the exhaust clean-up catalyst and used as the radio wave absorber for heating the catalyst. Accordingly, micro coils that function as a radio wave absorber, even under a high-temperature environment and an oxidizing atmosphere, have been desired.

This disclosure provides a micro coil (which may also be referred to as "micro coil with a coating layer") that functions as a radio wave absorber, even under a high-temperature environment and an oxidizing atmosphere A micro coil according to one aspect of the disclosure includes a micro coil body having heat resistance sufficient to keep the micro coil body from thermal decomposition and melting in a high-temperature environment, and a coating layer provided on a surface of the micro coil body. The coating layer has heat resistance, and has electrical conductivity under the high-temperature environment and an oxidizing atmosphere. In the micro coil, the coating layer has a shape that causes induced current to be produced according to a magnetic-field component of radio waves, when the micro coil receives the radio waves.

In the micro coil according to the above aspect, the coating layer having conductivity is formed on the surface of the micro coil body, in a shape that causes induced current to be produced according to a magnetic-field component of radio waves when the micro coil is irradiated with the radio waves. Therefore, when the micro coil with the coating layer is irradiated with radio waves (electromagnetic waves), such as microwaves, induced current is produced in the coating layer (in the micro coil body and the coating layer when the micro coil body also has conductivity), according to the magnetic-field component of the radio waves, and the induced current thus produced flows in the coating layer (the micro coil body and the coating layer when the micro coil body also has conductivity), to generate Joule heat. Accordingly, the micro coil with the coating layer can function as a radio wave absorber, even under the high-temperature environment and oxidizing atmosphere.

Further, in the micro coil with the coating layer as described above, the micro coil body has heat resistance, and the coating layer has heat resistance, and also has electrical conductivity even under a high-temperature environment and an oxidizing atmosphere. Therefore, even in the case where the micro coil with the coating layer is placed under the high-temperature environment and the oxidizing atmosphere, the coating layer can keep the above shape and conductivity. Accordingly, the micro coil with the coating layer can function as a radio wave absorber, even under the high-temperature environment and oxidizing atmosphere.

In the micro coil according to the above aspect, the micro coil body may be one of a silicon nitride micro coil composed of silicon nitride, a titanium oxide micro coil composed of titanium oxide, and a titanium carbide micro coil composed of titanium carbide, and the coating layer may be configured to cover a part or an entire area of the surface of the micro coil body.

With the coating layer as described above thus provided, the micro coil can function as a radio wave absorber, under a high-temperature environment and an oxidizing atmosphere, even if the micro coil body does not have electrical conductivity.

In the micro coil according to the above aspect, the micro coil body may include a carbon micro coil composed of carbon, or a titanium carbide micro coil composed of titanium carbide, and the coating layer may be configured to cover an entire area of the surface of the micro coil body.

With the above arrangement, the coating layer with which the entire area of the surface of the micro coil body is coated can prevent the carbon micro coil from being oxidized and gasified under a high-temperature environment and an oxidizing atmosphere. The coating layer can prevent the titanium carbide micro coil from being oxidized and losing conductivity under a high-temperature environment and an oxidizing atmosphere. Accordingly, when the micro coil with the coating layer is irradiated with radio waves, induced current is produced and flows in both the micro coil body (carbon micro coil or titanium carbide micro coil) and the coating layer, so that the Joule heat is generated. As a result, the micro coil with the coating layer can "convert energy of radio waves into thermal energy" with higher efficiency.

In the micro coil according to the above aspect, the coating layer may contain at least one of conductive metals, conductive metal oxides, and conductive metal composite oxides.

In the above case, the coating layer is composed of at least one of the conductive metals, conductive metal oxides, and conductive metal composite oxides, which have the conductivity and are favorably used for the coating layer. Thus, the coating layer can function as a radio wave absorber, even under a high-temperature environment and an oxidizing atmosphere.

In the micro coil as described above, the conductive metals may include one or more types of metal selected from platinum, gold, zinc, and silver, and the conductive metal oxides may include one or more types of metal oxide selected from silver oxide and zinc oxide, while the conductive metal composite oxides may include perovskite oxide.

In the above case, the coating layer is composed of a material or materials favorably used for the coating layer, and can function as a radio wave absorber, even under a high-temperature environment and an oxidizing atmosphere.

In the micro coil as described above, the perovskite oxide may be selected from perovskite oxides having NOx removing capability.

In the above case, the coating layer is comprised of a perovskite oxide, which is favorably used for the coating layer, and also has NOx removing capability. Therefore, the coating layer can function as a radio wave absorber, even under a high-temperature environment and an oxidizing atmosphere, and can also function as a NOx removal catalyst.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1A:
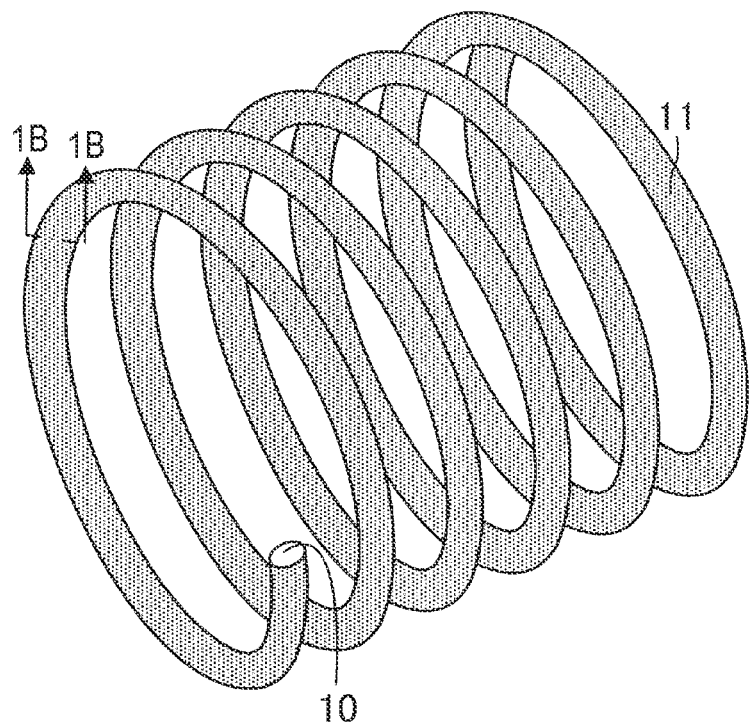
FIG. 1A is a schematic view showing the structure of a micro coil with a coating layer according to one embodiment of the disclosure.

A micro coil with a coating layer according to one embodiment of the disclosure will be described referring to the drawings. The micro coil with the coating layer may be favorably used as a radio wave absorber included in a heating unit that heats an exhaust clean-up catalyst for cleaning up exhaust gas, in an emission control system of an internal combustion engine, for example. The heating unit generates heat when it is irradiated with microwaves.

Configuration of Micro Coil with Coating Layer

Figure 1B:
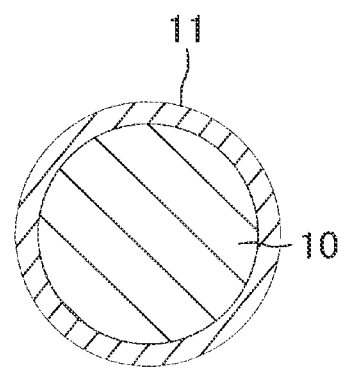
FIG. 1B is a cross-sectional view of the micro coil of FIG. 1A, which is cut in a plane taken along line 1B-1B in FIG. 1A.

As shown in FIG. 1 A and FIG. 1B, the micro coil with the coating layer has a micro coil body 10, and a coating layer 11 formed on a surface of the micro coil body 10.

Figure 2A:
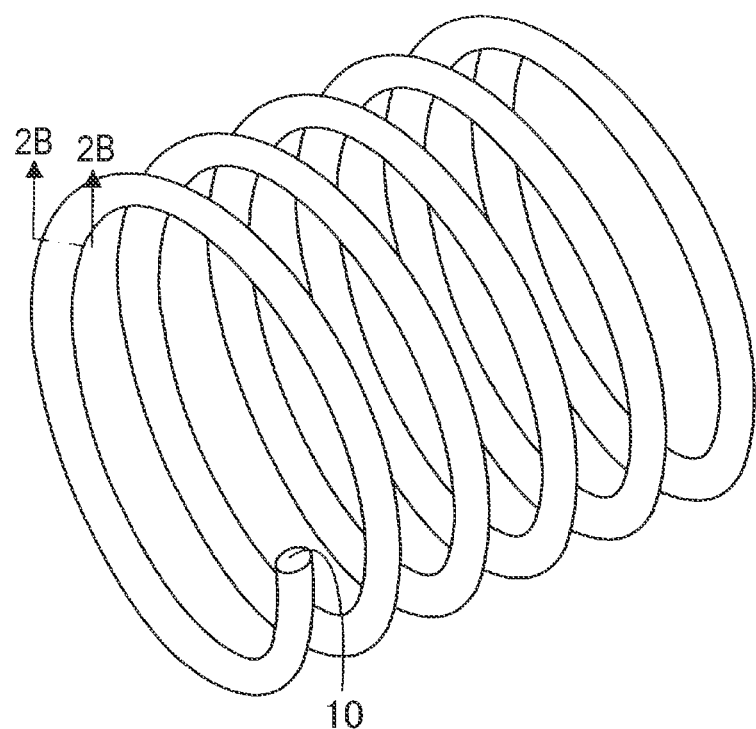
FIG. 2A is a schematic view showing the structure of a micro coil body of the micro coil shown in FIG. 1A.

As shown in FIG. 2A, the micro coil body 10 has a coil shape (helical shape). The coil diameter of the micro coil body 10 is within a range of submicron to several dozens of microns, and its length (axial length) is within a range of several dozens of microns to several hundreds of microns, for example. The micro coil body 10 is a micro coil (which may be called "heat-resistant, insulating micro coil" when appropriate) having heat resistance and insulating capacity, and is composed of a coil-shaped material having heat resistance and insulating capacity.

The "heat resistance" refers to "heat resistance sufficient to keep the micro coil body from thermal decomposition and melting in a high-temperature environment (an environment of temperatures equal to or higher 500° C. and equal to or lower than 1000° C., for example)". The "insulating capacity" refers to "insulating capacity equivalent to the volume resistivity equal to or lager than $10^6$ Ωm". The heat-resistant, insulating micro coil has the insulating capacity at ordinary temperatures.

Examples of the heat-resistant, insulating material used for the micro coil body 10 include one or more types of insulating inorganic materials (namely, inorganic materials of which the volume resistivity is $10^6$ Ωcm or larger at ordinary temperatures) selected from metal oxides (e.g., titanium oxide ($TiO_2$)) and semimetal nitrides (e.g., silicon nitride ($Si_3N_4$)).

More specifically, as the micro coil body 10, a coil-shaped $TiO_2$ micro coil composed of titanium oxide ($TiO_2$), a coil-shaped $Si_3N_4$ micro coil composed of silicon nitride ($Si_3N_4$), or the like, may be used. These micro coils may be produced according to known methods (for example, see Japanese Patent Application Publication No. 2011-148682 (JP 2011-148682 A), Chemical Physics Letters 378 (2003), 111-116, and Journal of the Ceramic Society of Japan 116[9], 921-927, 2008).

The coating layer 11 is formed on the entire area of the surface of the micro coil body 10, and forms a coil shape following the shape of the micro coil body 10. It is, however, to be noted that the coating layer 11 is not necessarily formed on the entire area of the surface of the micro coil body 10, provided that at least a part of the coating layer 11 has a coil shape following the coil shape of the micro coil body 10. Thus, the coating layer 11 may be formed on a part of the surface of the micro coil body 10. In other words, the coating layer 11 is only required to be shaped such that, when the micro coil with the coating layer is irradiated with radio waves, induced current is produced in the coating layer 11 according to a magnetic-field component of the radio waves, and Joule heat is generated due to flow of the induced current in the coating layer 11.

In some embodiments, the thickness of the coating layer 11 is, for example, equal to or larger than 0.1 μm and equal to or smaller than 10 μm, and in some other embodiments, the thickness of the coating layer 11 is, for example, equal to or larger than 0.2 μm and equal to or smaller than 2 μm. It is, however, to be noted that the thickness of the coating layer 11 can be set as appropriate depending on its material. The coating layer 11 is not necessarily required to cover the entire area of the surface of the micro coil body 10, provided that the micro coil body 10 is surrounded with the coating layer 11 so that induced current can be generated.

The coating layer 11 is composed of one type or a mixture of two or more types of materials having heat resistance, and having electrical conductivity even under a high-temperature environment (e.g., an environment of temperatures equal to or higher than 500° C. and equal to or lower than 1000° C.), and an oxidizing atmosphere.

Examples of the material of the coating layer 11 include one or more types of conductive metals selected from conductive noble metals (such as silver (Ag), platinum (Pt), and gold (Au)), and metals (such as zinc (Zn)) of which the oxides have conductivity. The conductive metal may be an alloy including the above-indicated metals, provided that the alloy has heat resistance, and has electrical conductivity even under the high-temperature environment and the oxidizing atmosphere. Examples of the material of the coating layer 11 also include conductive metal oxides (for example, one or more types of oxides selected from silver oxide ($Ag_2O$), zinc oxide (ZnO), etc.). Examples of the material of the coating layer 11 further include conductive metal composite oxides (such as perovskite-type oxides). Examples of the perovskite-type oxides include perovskite-type oxides (such as $La_{0.8}Sr_{0.2}CoO_3$, and $La_{0.4}Sr_{0.6}Mn_{0.8}Ni_{0.3}$) having NOx removing capability. It is known in the art that these perovskite-type oxides have NOx removing capability (for example, see "Reaction mechanism of direct decomposition of nitric oxide over Co- and Mn-based perovskite-type oxides", J Chem. Soc., Faraday Trans., 1998, Vol. 94 1887-1891, "Recent progress in catalytic NO decomposition", Comptes Rendus Chimie, 19 (2016), 1254-1265, etc.).

In the micro coil with the coating layer, the coating layer 11 has electrical conductivity, and has a coil shape following the coil shape of the micro coil body 10. Therefore, when the micro coil with the coating layer is irradiated with microwaves (radio waves, electromagnetic waves), induced current is produced in the coil-shaped coating layer 11 according to a magnetic-field component of the microwaves, and the induced current thus produced flows in the coil-shaped coating layer 11, to generate Joule heat. Accordingly, even if the micro coil body 10 does not have electrical conductivity (namely, even if it has insulating capacity), the micro coil with the coating layer can function as a radio wave absorber that converts radio wave energy into thermal energy and generates heat.

In the micro coil with the coating layer, the micro coil body 10 has heat resistance, and the coating layer 11 "has heat resistance, and has electrical conductivity even under a high-temperature environment and an oxidizing atmosphere". Therefore, even when the micro coil with the coating layer is placed under a high-temperature environment and an oxidizing atmosphere, the coating layer 11 can keep the coil shape and conductivity. Accordingly, the micro coil with the coating layer can function as a radio wave absorber, even under the high-temperature environment and oxidizing atmosphere. Accordingly, the micro coil with the coating layer may be placed in "an exhaust clean-up catalyst unit of an internal combustion engine" under a high-temperature environment and an oxidizing atmosphere. Further, in this case, the exhaust clean-up catalyst unit is provided with a device for transmitting microwaves (electromagnetic waves) to the micro coil with the coating layer placed inside the unit.

Method for Producing Micro Coil with Coating Layer

To produce the micro coil with the coating layer, the micro coil body 10 is typically produced according to the known method as described above, using the material of the micro coil body 10 as described above. Then, a material of which the coating layer 11 is composed is formed, in the form of a thin film, on the surface of the micro coil body 10, according to a known thin-film forming method as described below.

For example, the thin film (coating layer 11) may be formed by a gas phase method selected from CVD (Chemical Vapor Deposition) methods, PVD (Physical Vapor Deposition) methods, and so forth. Further, the thin film (coating layer 11) may also be formed according to a liquid phase method selected from a sol-gel method, a coprecipitation method, and so forth.

According to the CVD method, energy, such as heat, light, and plasma, is applied to the thin-film forming material that is supplied as gas, for decomposition and reaction of the material gas molecules, so that an intermediate product is formed, and a thin film is deposited on a surface of an object on which the thin film (coating layer 11) is to be formed, through adsorption, reaction, and separation.

Examples of the CVD method include a thermal CVD method, MOCVD (Metal Organic Chemical Vapor Deposition) method, RF plasma CVD method, light CVD method, laser CVD method, LPE (Liquid Phase Epitaxy) method, and other methods.

According to the PVD method, a thin-film material that provides a thin film is once evaporated or gasified, with energy, such as heat or plasma, so as to form a thin film on a substrate. Examples of the PVD method include vacuum vapor deposition methods (e.g., resistance heating method, high-frequency induction heating deposition method, electronic beam deposition method, etc.), sputtering, ion plating, MBE (molecular beam epitaxy), laser ablation method, and other methods.

By suitably selecting one of the above-indicated thin-film forming methods, a thin film of the material of the coating layer 11 as described above is formed on the surface of the micro coil body 10, to form the coating layer 11. In the following, the method for producing the coating layer 11 will be more specifically described.

Method for Producing Micro Coil with Coating Layer, using Thermal CVD Device

Figure 3:
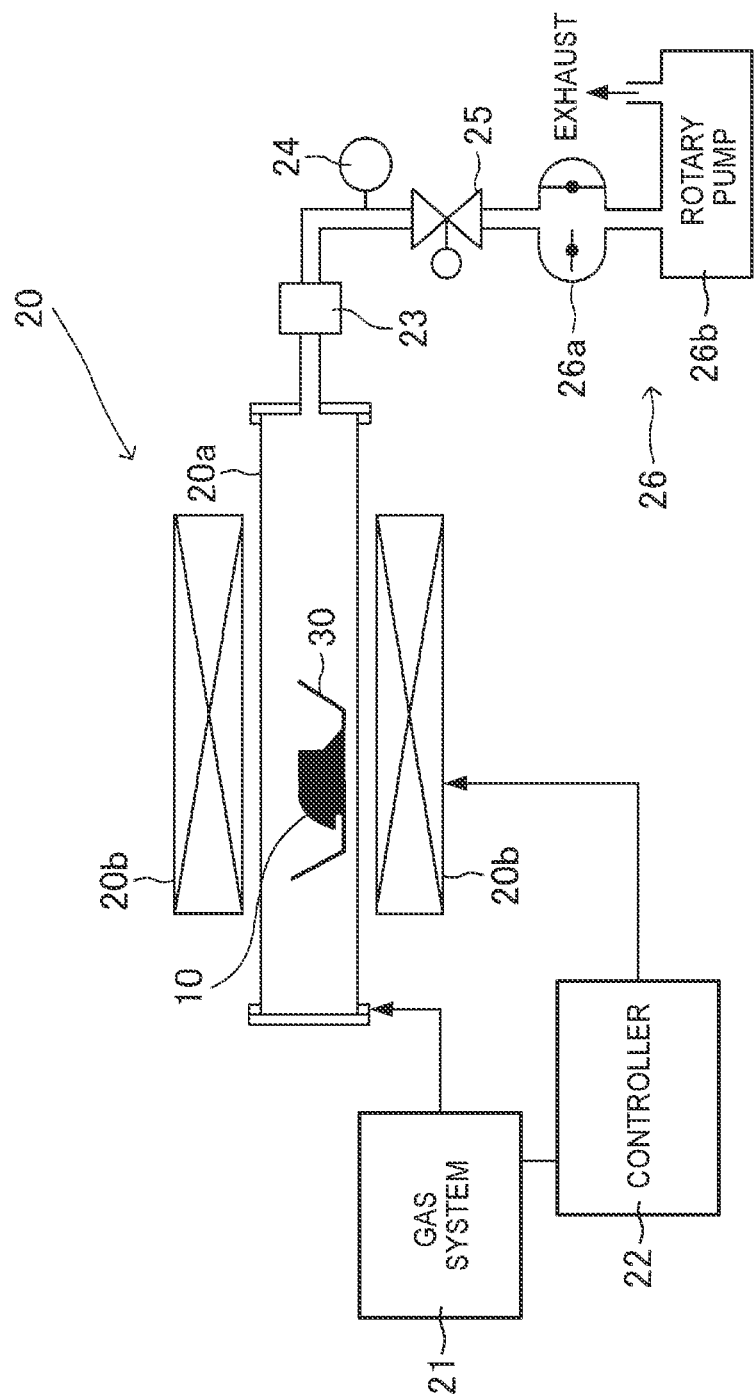
FIG. 3 is a schematic view of a CVD device used for producing micro coils with coating layers.

The micro coil with the coating layer may be produced, using a thermal CVD device. As shown in FIG. 3, the thermal CVD device includes a resistance heating furnace 20, gas system 21, controller 22, cooling trap 23, pressure gauge 24, air valve 25, and a pump unit 26.

The resistance heating furnace 20 includes a quartz reaction tube 20a having interior space (chamber) isolated from the outside air, and a heater 20b for heating the interior space of the quartz reaction tube 20a. The controller 22 is an electronic control unit that controls the gas system 21 and the resistance heating furnace 20. The pump unit 26 includes a mechanical booster pump 26a and a rotary pump 26b.

The pressure in the interior space (chamber) can be reduced by operating the pump unit 26 so as to suck and discharge gas in the resistance heating furnace 20, via the cooling trap 23. Further, the air valve 25 operates to control the flow rate of the gas passing therethough, so that the pressure in the interior space (chamber) can be controlled to a desired pressure.

Figure 2B:
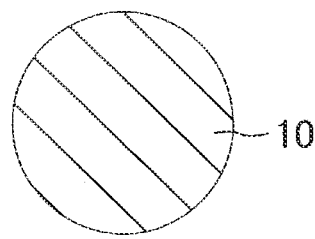
FIG. 2B is a cross-sectional view of the micro coil body of FIG. 2A, which is cut in a plane taken along line 2B-2B in FIG. 2A.

The micro coil body 10 as shown in FIG. 2A and FIG. 2B is placed in a heat-proof dish 30 set at a predetermined position in the interior space of the resistance heating furnace 20. Then, atmosphere gas within the internal space (chamber) is replaced with atmosphere gas (such as an oxygen atmosphere or an inert atmosphere) suitable for formation of the coating layer 11, by use of the gas system 21.

Then, the interior space is heated to a temperature equal to or higher than a decomposition temperature of material gas (which will be described later) for forming the coating layer 11. After completion of heating, gas including at least the material gas is supplied from the gas system 21 to the interior space. As a result, the material gas decomposes in the interior space and on the surface of the micro coil body 10, so that a decomposed component of the material gas is deposited on the micro coil body 10, so as to form a coating film that provides the coating layer 11.

As the material gas, at least one of inorganic metal compounds and organic metal compounds including a component (metallic species) that constitutes the coating layer 11 is suitably selected and used. When the coating layer 11 is composed of a conductive metal composite oxide, two or more species of materials (for example, two or more species of organic metal compounds) are mixed together, according to two or more metallic species of the conductive metal composite compound, and the materials thus mixed are gasified, to prepare material gas.

As the material gas, gas obtained by gasifying one or more species selected from metallic acetates, such as silver acetate ($CH_3COOAg$), zinc acetate (($CH_3COO)_2Zn$), lanthanum acetate (($CH_3COO)_3La$), strontium nitrate ($Sr(NO_3)_2$), barium acetate (($CH_3COO_2$)Ba), and iron acetate (($CH_3COO)_2Fe$), for example, may be used.

Method for Producing Micro Coil with Coating Layer by Coprecipitation Method

As another example of a method for producing the micro coil with the coating layer, a production method using the coprecipitation method will be described. This production method is favorably used when the coating layer 11 is composed of a conductive metal composite oxide. Initially, the micro coil body 10 is mixed with two or more species of metallic acetates, or the like, as materials of the conductive metal composite oxide, and a solution is prepared by dissolving the mixture in water. Then, ammonia water ($NH_3$ water), or the like, is added to the solution, so that the pH of the solution is controlled to be equal to or larger than pH 12, and equal to or smaller than pH 14. As a result, respective types of metallic ions in the solution produced by dissolving the two or more species of metallic acetates in water form metallic hydroxides, which are co-precipitated with the micro coil body 10. The metallic hydroxides are adsorbed on the surface of the micro coil body 10. Then, the micro coil body 10 on which the metallic hydroxides are adsorbed is collected from the mixed solution of which the pH has been controlled, through filtering or centrifugal separation. Then, the collected micro coil body 10 is fired at a given temperature (e.g., a temperature equal to or higher than 500° C. and equal to or lower than 1200° C.). In this manner, the coating layer 11 composed of the conductive metal composite oxide is formed on the surface of the micro coil body 10.

In the micro coil with the coating layer according to the above embodiment of the disclosure, the micro coil body 10 has heat resistance, and the coating layer 11 has electrical conductivity even under a high-temperature environment and an oxidizing atmosphere; therefore, the coil-shaped coating layer 11 can keep conductivity even under the high-temperature environment and oxidizing atmosphere. Accordingly, the micro coil with the coating layer can function as a radio wave absorber, even under the high-temperature environment and oxidizing atmosphere (for example, in an exhaust clean-up catalyst device of an internal combustion engine).

MODIFIED EXAMPLES

While one embodiment of the disclosure has been specifically described above, the disclosure is not limited to the above embodiment, but the embodiment may be subjected to various modifications based on the technical concept of the disclosure.

For example, as the micro coil body 10, a micro coil made of a material having electrical conductivity may be employed. For example, a carbon micro coil (micro coil made of carbon) has conductivity, but is oxidized and gasified under a high-temperature environment and an oxidizing atmosphere. However, if the whole (the entire area of the surface) of the carbon micro coil is coated with the coating layer 11, the gasification does not take place, and the carbon micro coil can be used as the micro coil body 10. Further, a TiC micro coil (micro coil made of titanium carbide (TiC)) has electrical conductivity, but it loses conductivity when oxidized under a high-temperature environment and an oxidizing atmosphere. However, if the whole of the TiC micro coil is coated with the coating layer 11, the oxidization does not take place, and the TiC micro coil can be used as the micro coil body 10 that keeps conductivity.

When the micro coil with the coating layer using a micro coil having conductivity, such as the "carbon micro coil and TiC micro coil", as the micro coil body 10 is irradiated with radio waves, such as microwaves, induced current is produced in the micro coil body 10 as well as the coating layer 11, due to a magnetic-field component of the radio waves. Then, the induced current thus produced flows in the micro coil body 10 and the coating layer 11, so that Joule heat is generated. Accordingly, the micro coil with the coating layer can "convert radio wave energy into thermal energy" with higher efficiency. Thus, the micro coil with the coating layer, which has excellent energy efficiency, is provided.

When the TiC micro coil is used as the micro coil body 10, and the TiC micro coil, except for a part of the surface thereof, is coated with the coating layer 11, the part of the surface which is not coated with the coating layer 11 is oxidized and loses conductivity. However, even in this case, the coating layer 11 keeps conductivity; therefore, the resulting product can be used as a micro coil (radio wave absorber) that can "convert radio wave energy into thermal energy" under a high-temperature environment and an oxidizing atmosphere.

As another modified example, in the micro coil with the coating layer, the coating layer 11 may consist of two or more layers. In this case, the above-indicated material that forms the coating layer 11 may form each layer of the two or more layers.

Further, in this case, the first layer formed on the surface of the micro coil body 10 may be provided by a layer having electrical conductivity, and one or more layers laminated on the first layer may be provided by a protective layer or layers having heat resistance and serving to protect the first layer. In this case, the first layer is covered with the protective layer(s), and is thus prevented from being directly exposed to an oxidizing atmosphere. Accordingly, the first layer is less likely or unlikely to be altered and have reduced conductivity, under a high-temperature environment and an oxidizing atmosphere. As a result, the micro coil with the coating layer having the protective layer(s) as described above can function as a radio wave absorber, even under a high-temperature environment and an oxidizing atmosphere.

Examples of the material that forms the first layer include one or more types of conductive metals selected from iron (Fe), copper (Cu), and so forth. Examples of the material that forms the protective layer include the above-described material that forms the coating layer 11, passive state (metal having a surface on which an oxide coating is formed) of one or more types of metals selected from aluminum (Al), chromium (Cr), titanium (Ti), etc., metal having a surface on which an oxide coating can be formed, and a material, such as a metallic oxide, which exhibits stability against a high-temperature, oxidizing atmosphere.

When the micro coil with the coating layer is produced, the coating layer 11 that is shaped such that induced current is produced when it is irradiated with radio waves may be intentionally formed on only a part of the surface of the micro coil body 10, in the following manner. For example, a mask material is formed on a portion of the micro coil body 10 other than a portion on which the coating layer 11 is to be formed, and the coating layer 11 is formed on the surface of the micro coil body 10 in this condition, by the method as described above. Then, the mask material is removed.

What is claimed is:

1. A micro coil comprising:
   a micro coil body having heat resistance sufficient to keep the micro coil body from thermal decomposition and melting in a high-temperature environment; and
   a coating layer provided on a surface of the micro coil body, the coating layer having the heat resistance, and having electrical conductivity under the high-temperature environment and an oxidizing atmosphere, wherein
   the coating layer has a shape that causes induced current to be produced according to a magnetic-field component of radio waves, when the micro coil receives the radio waves.

2. The micro coil according to claim 1, wherein:
   the micro coil body comprises one of a silicon nitride micro coil composed of silicon nitride, a titanium oxide micro coil composed of titanium oxide, and a titanium carbide micro coil composed of titanium carbide; and
   the coating layer is configured to cover a part or an entire area of the surface of the micro coil body.

3. The micro coil according to claim 1, wherein:
   the micro coil body comprises a carbon micro coil composed of carbon, or a titanium carbide micro coil composed of titanium carbide; and
   the coating layer is configured to cover an entire area of the surface of the micro coil body.

4. The micro coil according to claim 1, wherein the coating layer comprises at least one of conductive metals, conductive metal oxides, and conductive metal composite oxides.

5. The micro coil according to claim 4, wherein the conductive metals include one or more types of metal selected from platinum, gold, zinc, and silver, and the conductive metal oxides include one or more types of metal oxide selected from silver oxide and zinc oxide, while the conductive metal composite oxides include perovskite oxide.

6. The micro coil according to claim 5, wherein the perovskite oxide is selected from perovskite oxides having NOx removing capability.

7. The micro coil according to claim 1, wherein the coating layer has a coil shape following a coil shape of the micro coil body.

8. The micro coil according to claim 1, wherein the high-temperature environment is an environment of temperatures equal to or higher 500° C. and equal to or lower than 1000° C.

* * * * *